United States Patent
Meng et al.

(10) Patent No.: US 9,817,504 B2
(45) Date of Patent: Nov. 14, 2017

(54) TOUCH DISPLAY DRIVING METHOD AND DEVICE, DISPLAY DEVICE AND APPLICATION PROCESSOR

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Chen Meng, Beijing (CN); Xiaobo Xie, Beijing (CN); Tiankuo Shi, Beijing (CN); Xiurong Wang, Beijing (CN); Di Wang, Beijing (CN); Bo Gao, Beijing (CN); Hao Zhang, Beijing (CN); Lingyun Shi, Beijing (CN); Jialong Li, Beijing (CN); Yafei Li, Beijing (CN); Wei Wang, Beijing (CN); Zijiao Xue, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/107,758

(22) PCT Filed: Jan. 6, 2016

(86) PCT No.: PCT/CN2016/070227
§ 371 (c)(1),
(2) Date: Jun. 23, 2016

(87) PCT Pub. No.: WO2017/012296
PCT Pub. Date: Jan. 26, 2017

(65) Prior Publication Data
US 2017/0199602 A1 Jul. 13, 2017

(30) Foreign Application Priority Data
Jul. 17, 2015 (CN) .......................... 2015 1 0425224

(51) Int. Cl.
*G06F 3/041* (2006.01)
*G09G 3/20* (2006.01)

(52) U.S. Cl.
CPC .......... *G06F 3/0412* (2013.01); *G06F 3/0416* (2013.01); *G09G 3/2092* (2013.01);
(Continued)

(58) Field of Classification Search
CPC ... G06F 3/0412; G06F 3/0416; G09G 3/2092; G09G 2310/0267; G09G 2310/0275; G09G 2310/08
See application file for complete search history.

(56) References Cited

U.S. PATENT DOCUMENTS

| 2013/0176251 | A1* | 7/2013 | Wyatt | G09G 5/18 345/173 |
| 2014/0071066 | A1 | 3/2014 | Lee et al. | |

FOREIGN PATENT DOCUMENTS

| CN | 103236240 A | 8/2013 |
| CN | 104345490 A | 2/2015 |
| CN | 104978068 A | 10/2015 |

OTHER PUBLICATIONS

International Search Report dated Apr. 20, 2016 issued in corresponding International Application No. PCT/CN2016/070227 along with an English translation of the Written Opinion of the International Searching Authority.

* cited by examiner

*Primary Examiner* — Charles Hicks
(74) *Attorney, Agent, or Firm* — Nath, Goldberg & Meyer; Joshua B. Goldberg; Christopher Thomas

(57) ABSTRACT

The present invention discloses a touch display driving method, a touch display driving device, a display device and an application processor. The touch display driving method includes steps of: outputting, by an application processor, display data for a current row to the driving module after a driving module completes display driving and touch driving for a previous row; and outputting, in a display stage, the display data for the current row by the driving module so as to perform display, and outputting, in an H-blank stage, a touch driving signal by the driving module so as to perform touch detection.

17 Claims, 3 Drawing Sheets

(52) U.S. Cl.
CPC ............... *G09G 2310/0267* (2013.01); *G09G 2310/0275* (2013.01); *G09G 2310/08* (2013.01)

TOUCH DISPLAY DRIVING METHOD AND DEVICE, DISPLAY DEVICE AND APPLICATION PROCESSOR

This is a National Phase Application filed under 35 U.S.C. 371 as a national stage of PCT/CN2016/070227, filed Jan. 6, 2016, an application claiming the benefit of Chinese Application No. 201510425224.1, filed Jul. 17, 2015, the content of each of which is hereby incorporated by reference in its entirety.

FIELD OF THE INVENTION

The present invention relates to the field of display technology, and specifically relates to a touch display driving method, a touch display driving device, a display device and an application processor.

BACKGROUND OF THE INVENTION

At present, a display function and a touch function can be implemented in a full-in-cell display device by means of horizontal blanking (H-blank), that is, a normal display is performed in a display stage, and a touch action is detected in an H-blank stage.

In the prior art, a driving module, such as a touch with display driver (referred to as TDDI), usually performs touch detection in the H-blank stage by using a row buffer. For example, the row buffer may be implemented by providing a row buffer area within the driving module.

However, cost will be increased by providing the row buffer area in the driving module. That is to say, the cost of the driving module will be increased when the driving module performs touch detection in the H-blank stage by using a row buffer.

SUMMARY OF THE INVENTION

The present invention provides a touch display driving method, a touch display driving device, a display device and an application processor, in order to reduce the cost of a driving module.

To achieve the above object, the present invention provides a touch display driving method, which includes steps of:

outputting, by an application processor, display data for a current row to a driving module after the driving module completes display driving and touch driving for a previous row; and outputting the display data for the current row in a display stage so as to perform display, and outputting a touch driving in an H-blank stage so as to perform touch detection, by the driving module.

Optionally, the step of outputting the display data for the current row to the driving module by the application processor includes: outputting, by the application processor, the display data for the current row to the driving module based on a synchronous clock signal.

Optionally, the step of outputting the display data for the current row by the driving module includes: outputting, by the driving module, the display data for the current row based on a synchronous clock signal.

Optionally, the step of outputting the display data for the current row by the driving module includes: outputting, by the driving module, the display data for the current row according to a situation of outputting the display data for the current row by the application processor.

Optionally, the touch display driving method may further includes steps of: outputting, by the driving module, a feedback signal to the application processor before the application processor outputs the display data for the current row to the driving module; and outputting, by the application processor, the display data for the current row to the driving module after the application processor receives the feedback signal.

To achieve the above object, the present invention provides a touch display driving device, which includes a driving module and an application processor. The application processor outputs display data for a current row to the driving module after the driving module completes display driving and touch driving for a previous row. The driving module outputs the display data for the current row in a display stage so as to perform display, and outputs a touch driving signal in an H-blank stage so as to perform touch detection.

Optionally, the application processor may output the display data for the current row to the driving module based on a synchronous clock signal.

Optionally, the driving module may output the display data for the current row, which is outputted from the application processor, based on the synchronous clock signal.

Optionally, the driving module may further output a feedback signal to the application processor before the application processor outputs the display data for the current row to the driving module, and the application processor is specifically used to output the display data for the current row to the driving module upon receipt of the feedback signal.

Optionally, the driving module may output the display data for the current row according to a situation of outputting the display data for the current row by the application processor.

Optionally, the driving module is a TDDI

Optionally, the driving module may include a gate driver, a source driver and a touching driver, and the display data includes a gate driving signal and a source driving signal. The gate driver may output the gate driving signal in the display stage, the source driver may output the source driving signal in the display stage, and the touching driver may output a touch driving signal in the H-blank stage.

To achieve the above object, the present invention provides a display device, which includes a display panel and the above touch display driving device.

Optionally, the driving module of the touch display driving device detects a touch action from a user on the display panel, and receives a sensing signal with respect to the touch action in the H-blank stage.

To achieve the above object, the present invention provides an application processor used in the above touch display driving device, which includes a storage module used for storing display data for respective rows, and an output module used for outputting, after a driving module of the touch display driving device completes display driving and touch driving for a previous row, the display data for a current row to the driving module.

Optionally, the output module may output the display data for the current row to the driving module based on a synchronous clock signal.

Optionally, the application processor may further include a receiving module, which is used for receiving a feedback signal sent by the driving module. The output module outputs the display data for the current row to the driving module after the receiving module receives the feedback signal.

The beneficial effect of the present invention is as follows.

In the touch display driving method, the touch display driving device, the display device and the application processor according to embodiments of the present invention, the application processor outputs the display data for the current row to the driving module after the driving module completes display driving and touch driving for the previous row and the driving module outputs the display data for the current row in the display stage so as to display, and outputs the touch driving signal in the H-blank stage so as to perform touch detection. In this way, there is no need to provide a row buffer area within the driving module, thereby reducing the cost of the driving module.

DETAILED DESCRIPTION OF THE EMBODIMENTS

To make those skilled in the art better understand the technical solutions of the present invention, a touch display driving method, a touch display driving device, a display device and an application processor provided by the present invention will be described in detail below in conjunction with the accompanying drawings.

Figure 1:
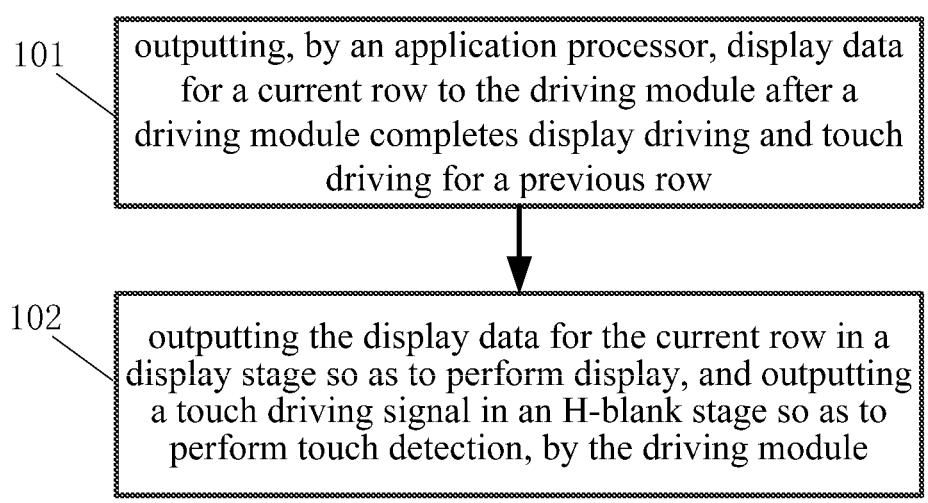
FIG. 1 is a flow chart of a touch display driving method according to an embodiment of the present invention.

FIG. 1 is a flow chart of a touch display driving method according to an embodiment of the present invention.

As shown in FIG. 1, in step 101, an application processor outputs display data for a current row to a driving module after the driving module completes display driving and touch driving for a previous row.

Preferably, the driving module may be a TDDI. The driving module may be used for driving a display panel, so as to allow the display panel to perform display and touch. The display panel may include a color filter substrate and an array substrate disposed opposite to each other, the array substrate may include a base substrate and gate lines and data lines provided thereon, and the data lines and the data lines define pixel units. All gate lines may be divided into a plurality of gate line groups, each of which includes several gate lines and corresponds to one row, in other words, one row may include multiple gate lines. For example, the array substrate may include twelve rows.

In this embodiment, the display data may include a gate driving signal and a source driving signal.

In this embodiment, the application processor (referred to as AP) may prestore display data for respective rows, and output the display data for respective rows to the driving module row by row. Specifically, the application processor may output the display data for the current row to the driving module after the driving module completes display driving and touch driving for the previous row.

Specifically, this step may include outputting, by the application processor, the display data for the current row to the driving module based on a synchronous clock signal. The synchronous clock signal may be preset, and the application processor and the driving module both operate based on the synchronous clock signal. Specifically, based on the synchronous clock signal, the application processor may output the display data for respective rows to the driving module at a first predetermined time interval, and the driving module may perform display driving and touch driving for the rows at a second predetermined time interval. This brings accurate timing as well as a simple method for outputting data.

Alternatively, in this step, the driving module may output a feedback signal to the application processor before the application processor outputs the display data for the current row to the driving module, wherein the driving module outputs the feedback signal to the application processor after completing display driving and touch driving for the previous row. The step of outputting the display data for the current row to the driving module by the application processor includes: outputting, by the application processor, the display data for the current row to the driving module after the application processor receives the feedback signal. This makes the timing for outputting data more flexible and the outputting method simpler.

Alternatively, the driving module may not operate based on the synchronous clock signal, but performs driving for display and/or touch based on a situation of outputting the display data for the current row thereto by the application processor. Specifically, the application processor may send an identifier to the driving module when completing the outputting of the display data for the current row, and the driving module may output the display data for the current row upon receipt of the identifier; alternatively, the size of the display data outputted by the application processor may be monitored, and, when the size of the display data outputted by the application processor is the same as the size of display data that can be stored in the driving module, the driving module outputs the display data for the current row.

As shown in FIG. 1, in step 102, the driving module outputs the display data for the current row in a display stage so as to perform display, and outputs a touch driving signal in an H-blank stage so as to perform touch detection.

In this embodiment, the H-blank stage is a long H-blank (referred to as LH-blank) stage.

Specifically, the driving module generates a touch driving signal, and outputs the same in the H-blank stage so as to perform touch detection.

Further, in the H-blank stage, if a user touches the display panel, i.e., the driving module detects a touch action, the driving module further receives a sensing signal resulted from the touch action.

The steps 101 and 102 are performed with respect to one row. For the entire display panel, the steps 101 and 102 are performed repeatedly so as to complete the process of displaying one frame of image and touching. Thereafter, it may continue to perform the process of displaying the next frame of image and touching.

Figure 2:
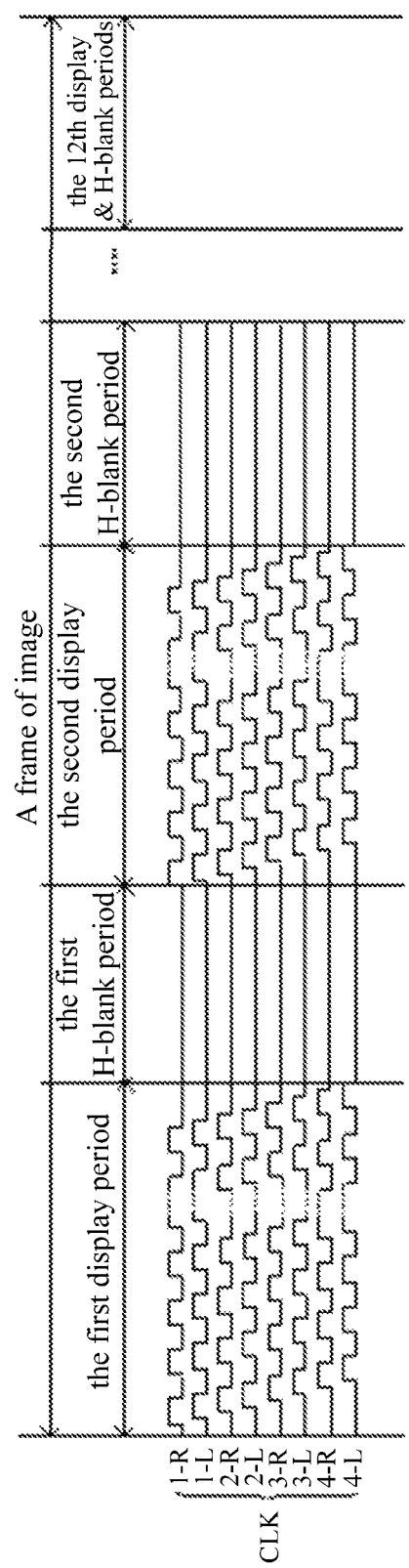
FIG. 2 is a schematic diagram illustrating a display stage and an H-blank stage in the touch display driving method as shown in FIG. 1.

Hereinafter, the method according to an embodiment of the present invention will be described with reference to FIG. 2. FIG. 2 is a schematic diagram illustrating the display stage and the H-blank stage in the touch display driving method as shown in FIG. 1.

As shown in FIG. 2, the driving process for each row includes a display stage and a following H-blank stage. FIG. 2 illustrates a case where the display panel includes twelve rows and driving is performed in unit of row, but the present invention is not limited thereto. In a first display stage, the driving module outputs the display data for a first row to the display panel so as to allow the display panel to perform display, and in a first H-blank stage, the driving module outputs the touch driving signal so as to perform touch detection. If the driving module detects a touch action in the first H-blank stage, it will receive a sensing signal resulted from the touch action. Such process is repeatedly performed with respect to other rows until a twelfth display stage and a following twelfth H-blank stage end. FIG. 2 shows a synchronous clock signal CLK corresponding to each stage, and the application processor may output the display data for the current row to the driving module according to the synchronous clock signal CLK. The synchronous clock signal CLK is provided in such a way that a left clock signal and a right clock signal become active by turns, and in FIG. 2, the designator "R" refers to "right" and the designator "L" refers to "left".

In the touch display driving method according to the embodiment of the present invention, the application processor outputs the display data for the current row to the driving module after the driving module completes display driving and touch driving for the previous row, and the driving module outputs the display data for the current row in the display stage so as to perform display, and outputs the touch driving signal in the H-blank stage so as to perform touch detection. According to the embodiments of the present invention, the application processor outputs the display data to the driving module according to a timing sequence, and thus there is no need to provide a row buffer area within the driving module, thereby reducing the cost of the driving module.

Figure 3:
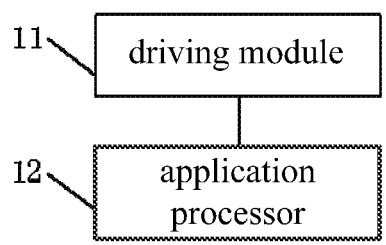
FIG. 3 is a structural schematic diagram of a touch display driving device according to an embodiment of the present invention.

FIG. 3 is a structural schematic diagram of a touch display driving device according to an embodiment of the present invention.

As shown in FIG. 3, the touch display driving device may include a driving module 11 and an application processor 12.

The application processor 12 outputs display data for a current row to the driving module 11 after the driving module 11 completes display driving and touch driving for a previous row. The driving module 11 outputs the display data for the current row in the display stage so as to perform display, and outputs a touch driving signal in the H-blank stage so as to perform touch detection.

Specifically, the application processor 12 may output the display data for the current row to the driving module based on a synchronous clock signal.

Alternatively, the driving module 11 may further output a feedback signal to the application processor 12 before the application processor 12 outputs the display data for the current row to the driving module 11. In this case, the application processor 12 outputs the display data for the current row to the driving module 11 after receiving the feedback signal.

The driving module 11 may operate based on the synchronous clock signal, and alternatively, may perform driving for display and/or touch according to a situation of outputting thereto the display data for the current row by the application processor. Specifically, the application processor may send an identifier to the driving module when completing the outputting of the display data for the current row, and the driving module may output the display data for the current row upon receipt of the identifier; alternatively, the size of the display data outputted by the application processor may be monitored, and, when the size of the display data outputted by the application processor is the same as the size of display data that can be stored in the driving module, the driving module outputs the display data for the current row.

Preferably, the driving module 11 may be a TDDI.

In addition, the driving module 11 may include a gate driver (Gate IC), a source driver (Source IC) and a touch driver (Touch IC), and the display data may include a gate driving signal and a source driving signal. The gate driver may output a gate driving signal in the display stage, the source driver may output a source driving signal in the display stage, and the touching driver may output a touch driving signal in the H-blank stage. In this case, the gate driver, the source driver and the touch driver are provided separately, rather than being integrated in one module, which is not illustrated in the drawings.

The touch display driving device provided by this embodiment may be used to implement the touch display driving method according to the embodiments of the present invention. The description of the touch display driving method may refer to the above description and is omitted herein.

In the technical solution of the touch display driving device according to the embodiment of the present invention, the application processor outputs the display data for the current row to the driving module after the driving module completes display driving and touch driving for the previous row, and the driving module outputs the display data for the current row in the display stage so as to display, and outputs the touch driving signal in the H-blank stage so as to perform touch detection. In the touch display driving device according to the embodiment of the present invention, the application processor outputs the display data to the driving module according to a timing sequence, and thus there is no need to provide a row buffer area within the driving module, thereby reducing the cost of the driving module.

An embodiment of the present invention provides a display device, which includes a display panel and the touch display driving device according to the embodiment of the present invention. The touch display driving device may be used to drive the display panel to perform display and touch.

Preferably, the display panel may include a color filter substrate and an array substrate disposed opposite to each other.

Preferably, the display device is a full in-cell display device.

In the display device according to the embodiment of the present invention, the application processor outputs the display data for the current row to the driving module after the driving module completes display driving and touch driving for the previous row, and the driving module outputs the display data for the current row in the display stage so as to display, and outputs the touch driving signal in the H-blank stage so as to perform touch detection. In the display device according to the embodiment of the present invention, the application processor outputs the display data to the driving module according to a timing sequence, and thus there is no need to provide a row buffer area within the driving module, thereby reducing the cost of the driving module.

Figure 4:
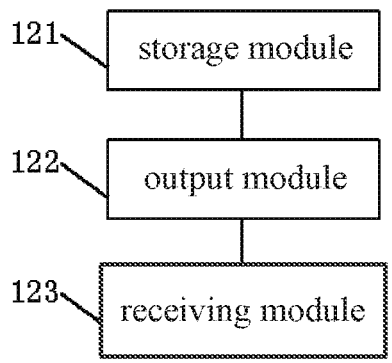
FIG. 4 is a structural schematic diagram of an application processor according to an embodiment of the present invention.

FIG. 4 is a structural schematic diagram of an application processor according to an embodiment of the present invention.

As shown in FIG. 4, the application processor includes a storage module 121 and an output module 122.

The storage module 122 is used to store display data for respective rows. The output module 122 is used to output the display data for a current row to the driving module after the driving module of the touch display driving device completes display driving and touch driving for the previous row, the driving module outputs the display data for the current row in the display stage so as to perform display and outputs the touch driving signal in the H-blank stage so as to perform touch detection.

Operationally, the output module 122 may output the display data for the current row to the driving module 11 based on a synchronous clock signal.

The application processor may further include a receiving module 123. The receiving module 123 is used to receive a feedback signal sent by the driving module 11. In this case, the output module 122 outputs the display data for the current row to the driving module 11 after the receiving module 123 has received the feedback signal.

In the application processor according to the embodiment of the present invention, the application processor outputs the display data for the current row to the driving module after the driving module completes display driving and touch driving for the previous row, and the driving module outputs the display data for the current row in the display stage so as to display, and outputs the touch driving signal in the H-blank stage so as to perform the touch detection. The application processor according to the embodiment of the present invention outputs the display data to the driving module according to a timing sequence, and thus there is no need to provide a row buffer area within the driving module, thereby reducing the cost of the driving module.

It can be understood that the foregoing implementations are merely exemplary implementations used for describing the principle of the present invention, but the present invention is not limited thereto. Those of ordinary skill in the art may make various variations and improvements without departing from the spirit and essence of the present invention, and these variations and improvements shall also fall into the protection scope of the present invention.

What is claimed is:

1. A touch display driving method, comprising steps of:
    outputting, by an application processor, display data for only a current row among display data for all rows stored in the application processor, to a driving module after the driving module completes display driving and touch driving for a previous row; and
    outputting the display data for the current row in a display stage so as to perform display, and outputting a touch driving signal in an H-blank stage so as to perform touch detection, by the driving module.

2. The touch display driving method according to claim 1, wherein the step of outputting the display data for only the current row to the driving module by the application processor includes: outputting, by the application processor, the display data for only the current row to the driving module based on a synchronous clock signal.

3. The touch display driving method according to claim 1, wherein the step of outputting the display data for the current row by the driving module includes: outputting, by the driving module, the display data for the current row based on a synchronous clock signal.

4. The touch display driving method according to claim 1, wherein the step of outputting the display data for the current row by the driving module includes: outputting, by the driving module, the display data for the current row, according to a situation of outputting the display data for the current row by the application processor.

5. The touch display driving method according to claim 1, further comprising steps of:
    outputting, by the driving module, a feedback signal to the application processor before the application processor outputs the display data for the current row to the driving module; and
    outputting, by the application processor, the display data for the current row to the driving module after the application processor receives the feedback signal.

6. A touch display driving device, comprising a driving module and an application processor, wherein
    the application processor outputs display data for only a current row among display data for all rows stored in the application processor, to a driving module after the driving module completes display driving and touch driving for a previous row, and
    the driving module outputs the display data for the current row in a display stage so as to perform display, and outputs a touch driving signal in an H-blank stage so as to perform touch detection.

7. The touch display driving device according to claim 6, wherein the application processor outputs the display data for the current row to the driving module based on a synchronous clock signal.

8. The touch display driving device according to claim 6, wherein the driving module outputs the display data for the current row, which is outputted from the application processor, based on a synchronous clock signal.

9. The touch display driving device according to claim 6, wherein the driving module outputs the display data for the current row according to a situation of outputting the display data for the current row by the application processor.

10. The touch display driving device according to claim 6, wherein the driving module outputs a feedback signal to the application processor before the application processor outputs the display data for the current row to the driving module; and
    the application processor outputs the display data for the current row to the driving module after receiving the feedback signal.

11. The touch display driving device according to claim 6, wherein the driving module is a touch with display driver.

12. The touch display driving device according to claim 6, wherein the driving module includes a gate driver, a source driver and a touching driver, and the display data includes a gate driving signal and a source driving signal; and wherein
    the gate driver outputs the gate driving signal for each row in the display stage;
    the source driver outputs the source driving signal for each row in the display stage; and
    the touching driver outputs a touch driving signal in the H-blank stage.

13. A display device, comprising a display panel and the touch display driving device according to claim 6.

14. The display device according to claim 13, wherein the driving module of the touch display driving device detects a touch action from a user on the display panel and receives a sensing signal with respect to the touch action in the H-blank stage.

15. An application processor, used in the touch display driving device according to claim 6 and comprising:
    a storage module used for storing display data for respective rows; and
    an output module used for outputting, after the driving module of the touch display driving device completes display driving and touch driving for a previous row, the display data for a current row to the driving module.

16. The application processor according to claim 15, wherein the output module outputs the display data for the current row to the driving module based on a synchronous clock signal.

17. The application processor according to claim 15, further comprising a receiving module used for receiving a feedback signal sent by the driving module, and wherein
the output module outputs the display data for the current row to the driving module after the receiving module receives the feedback signal.

* * * * *